United States Patent
Ogawa (10) Patent No.: US 12,311,915 B2
(45) Date of Patent: May 27, 2025

(54) HYBRID ELECTRIC VEHICLE AND CONTROL METHOD OF THE SAME

(71) Applicant: TOYOTA JIDOSHA KABUSHIKI KAISHA, Toyota (JP)

(72) Inventor: Yuki Ogawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 220 days.

(21) Appl. No.: 18/079,212

(22) Filed: Dec. 12, 2022

(65) Prior Publication Data

US 2023/0264678 A1 Aug. 24, 2023

(30) Foreign Application Priority Data

Feb. 18, 2022 (JP) .................. 2022-023640

(51) Int. Cl.
  *B60W 20/13* (2016.01)
  *B60K 6/26* (2007.10)
  *B60L 50/10* (2019.01)
  *B60L 58/12* (2019.01)
  *B60W 10/06* (2006.01)
  (Continued)

(52) U.S. Cl.
  CPC ............... *B60W 20/13* (2016.01); *B60K 6/26* (2013.01); *B60L 50/10* (2019.02); *B60L 58/12* (2019.02); *B60W 10/06* (2013.01); *B60W 10/08* (2013.01); *B60W 20/20* (2013.01); *H01M 10/425* (2013.01); *H01M 10/44* (2013.01); *B60Y 2300/182* (2013.01); *H01M 2010/4271* (2013.01); *H01M 2220/20* (2013.01)

(58) Field of Classification Search
  None
  See application file for complete search history.

(56) References Cited

U.S. PATENT DOCUMENTS 8,229,611 B2 7/2012 Yamada
2008/0262668 A1 10/2008 Yamada
(Continued)

FOREIGN PATENT DOCUMENTS

JP 2003-095042 A 4/2003
JP 2008-265594 A 11/2008
(Continued)

*Primary Examiner* — James J Lee
*Assistant Examiner* — Andrew Sang Kim
(74) *Attorney, Agent, or Firm* — Sughrue Mion, PLLC (57) ABSTRACT

A hybrid electric vehicle includes: a powertrain configured to execute hybrid traveling and power generation, and electric traveling, the hybrid traveling and the power generation being performed through cooperation of an internal combustion engine and one or more electric motors; a battery that transmits and receives electric power to and from the powertrain; and a control device. The control device executes management of a remaining battery level of the battery for securing a specific remaining battery level as traveling assistance, when a specific section in which operation of the internal combustion engine is restricted exists on a predicted travel route. The control device executes a selection process for selecting, based on presence or absence of an execution history of the traveling assistance and the remaining battery level, a traveling mode before entering the specific section from a BEV mode, an HEV mode, and a charging mode.

4 Claims, 5 Drawing Sheets

(51) Int. Cl.
*B60W 10/08* (2006.01)
*B60W 20/20* (2016.01)
*H01M 10/42* (2006.01)
*H01M 10/44* (2006.01)

(56) References Cited

U.S. PATENT DOCUMENTS

| | | | | |
|---|---|---|---|---|
| 2019/0126907 | A1* | 5/2019 | Park | B60W 20/16 |
| 2019/0143821 | A1* | 5/2019 | Bell | B60W 10/08 |
| | | | | 180/65.225 |
| 2020/0180599 | A1 | 6/2020 | Kang et al. | |
| 2021/0061254 | A1* | 3/2021 | Hashizume | B60W 20/40 |
| 2022/0001852 | A1 | 1/2022 | Kageura et al. | |

FOREIGN PATENT DOCUMENTS

| | | |
|---|---|---|
| JP | 2014-191456 A | 10/2014 |
| JP | 2018-086970 A | 6/2018 |
| JP | 2020-104755 A | 7/2020 |
| JP | 2022-13179 A | 1/2022 |

* cited by examiner

HYBRID ELECTRIC VEHICLE AND CONTROL METHOD OF THE SAME

CROSS-REFERENCE TO RELATED APPLICATION

This application claims priority to Japanese Patent Application No. 2022-023640 filed on Feb. 18, 2022, incorporated herein by reference in its entirety.

BACKGROUND

1. Technical Field

The present disclosure relates to a hybrid electric vehicle and a control method thereof.

2. DESCRIPTION OF RELATED ART

Japanese Unexamined Patent Application Publication No. 2003-095042 (JP 2003-095042 A) discloses a power generation control device for a vehicle. In order to reduce fuel consumption along the entire travel route, the power generation control device controls the power generation voltage of the generator for the vehicle based on the content of the planned travel route of the vehicle. The planned travel route is classified into, for example, three types of travel content: urban area, suburban area, and highway.

SUMMARY

In a hybrid electric vehicle that can travel by electric traveling (battery electric vehicle (BEV) traveling) using an electric motor without operating the internal combustion engine, it is conceivable to perform, as traveling assistance, appropriate management of the remaining battery level for securing the required remaining battery level to travel through, by the BEV traveling, a specific section where the operation of the internal combustion engine is restricted.

It is desirable that the management of the remaining battery level as described above be performed while securing, together with the required remaining battery level, a margin in consideration of error factors such as prediction errors of the required remaining battery level and traveling variations. On the other hand, for example, if excessive charging using the power of the internal combustion engine is performed in order to secure the remaining battery level, fuel consumption will be deteriorated.

The present disclosure has been made in view of the issues described above, and an object of the present disclosure is to provide a hybrid electric vehicle and a control method thereof that allow appropriate management of the remaining battery level to travel through, by BEV traveling, a specific section where the operation of an internal combustion engine is restricted.

A hybrid electric vehicle according to the present disclosure includes a powertrain, a battery, and a control device. The powertrain is configured to execute hybrid traveling and power generation, and electric traveling. The hybrid traveling and the power generation are performed through cooperation of an internal combustion engine and one or more electric motors, and the electric traveling is performed by the one or more electric motors without operating the internal combustion engine. The battery transmits and receives electric power to and from the powertrain. The control device executes management of a remaining battery level of the battery for securing a specific remaining battery level as traveling assistance, when a specific section in which operation of the internal combustion engine is restricted exists on a predicted travel route. The specific remaining battery level is obtained by adding a margin to a required remaining battery level required for traveling through the specific section by the electric traveling. The control device executes a selection process for selecting, based on presence or absence of an execution history of the traveling assistance and the remaining battery level, a traveling mode before entering the specific section from a BEV mode, an HEV mode, and a charging mode. The BEV mode is a mode in which the electric traveling is performed. The HEV mode is a mode in which the hybrid traveling is performed while maintaining the remaining battery level. The charging mode is a mode in which the hybrid traveling is performed while increasing the remaining battery level.

In the selection process, the control device may select the BEV mode or the charging mode when there is no execution history, and may select one of the BEV mode, the HEV mode, and the charging mode when there is the execution history.

In the selection process, the control device may select the BEV mode when the remaining battery level is equal to or greater than the specific remaining battery level.

In the selection process, the control device may select the charging mode such that the remaining battery level increases to the specific remaining battery level when there is no execution history and the remaining battery level is less than the specific remaining battery level. On the other hand, the control device may select the HEV mode when the remaining battery level is less than the specific remaining battery level and equal to or greater than the required remaining battery level, and may select the charging mode such that the remaining battery level increases to the specific remaining battery level when the remaining battery level is less than the required remaining battery level, in a case where there is the execution history.

A control method of a hybrid electric vehicle according to the present disclosure is a control method for controlling the hybrid electric vehicle including: a powertrain configured to execute hybrid traveling and power generation, and electric traveling, the hybrid traveling and the power generation being performed through cooperation of an internal combustion engine and one or more electric motors, and the electric traveling being performed by the one or more electric motors without operating the internal combustion engine; and a battery that transmits and receives electric power to and from the powertrain. The control method includes: executing management of a remaining battery level of the battery for securing a specific remaining battery level as traveling assistance, when a specific section in which operation of the internal combustion engine is restricted exists on a predicted travel route, the specific remaining battery level being obtained by adding a margin to a required remaining battery level required for traveling through the specific section by the electric traveling; and selecting, based on presence or absence of an execution history of the traveling assistance and the remaining battery level, a traveling mode before entering the specific section from a BEV mode, an HEV mode, and a charging mode, the BEV mode being a mode in which the electric traveling is performed, the HEV mode being a mode in which the hybrid traveling is performed while maintaining the remaining battery level, and the charging mode being a mode in which the hybrid traveling is performed while increasing the remaining battery level.

According to the present disclosure, it is possible to appropriately manage the remaining battery level for traveling through the specific section by the electric traveling (BEV traveling).

Specifically, according to the present disclosure, when a specific section in which operation of the internal combustion engine is restricted exists on a predicted travel route, management of a remaining battery level for securing a specific remaining battery level is executed as traveling assistance. The specific remaining battery level is obtained by adding a margin to a required remaining battery level required for traveling through the specific section by the electric traveling. As a result, the remaining battery level can be appropriately managed in consideration of the above-described error factors such as the prediction errors of the required remaining battery level and traveling variations. Further, according to the present disclosure, the traveling mode before entering the specific section is selected from the BEV mode, the HEV mode, and the charging mode based on the presence or absence of the execution history of the traveling assistance and the remaining battery level. As a result, for example, by selecting the HEV mode after obtaining the specific remaining battery level that satisfies the margin by the traveling assistance, it is possible to secure (maintain) a remaining battery level equivalent to the specific remaining battery level for traveling through the specific section while refraining from excessive charging.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the present disclosure will be described below with reference to the accompanying drawings. Elements common to each figure are given the same reference signs, and overlapping descriptions are omitted or simplified. In the following embodiments, when the number, a quantity, an amount, or a range of each element, for example, is mentioned, the technical idea of the present disclosure is not limited to the mentioned number, etc., unless otherwise specified or except for the case where the number is obviously limited to the number mentioned in the embodiments in principle.

1. Configuration Example of Hybrid Electric Vehicle (HEV)

Figure 1:
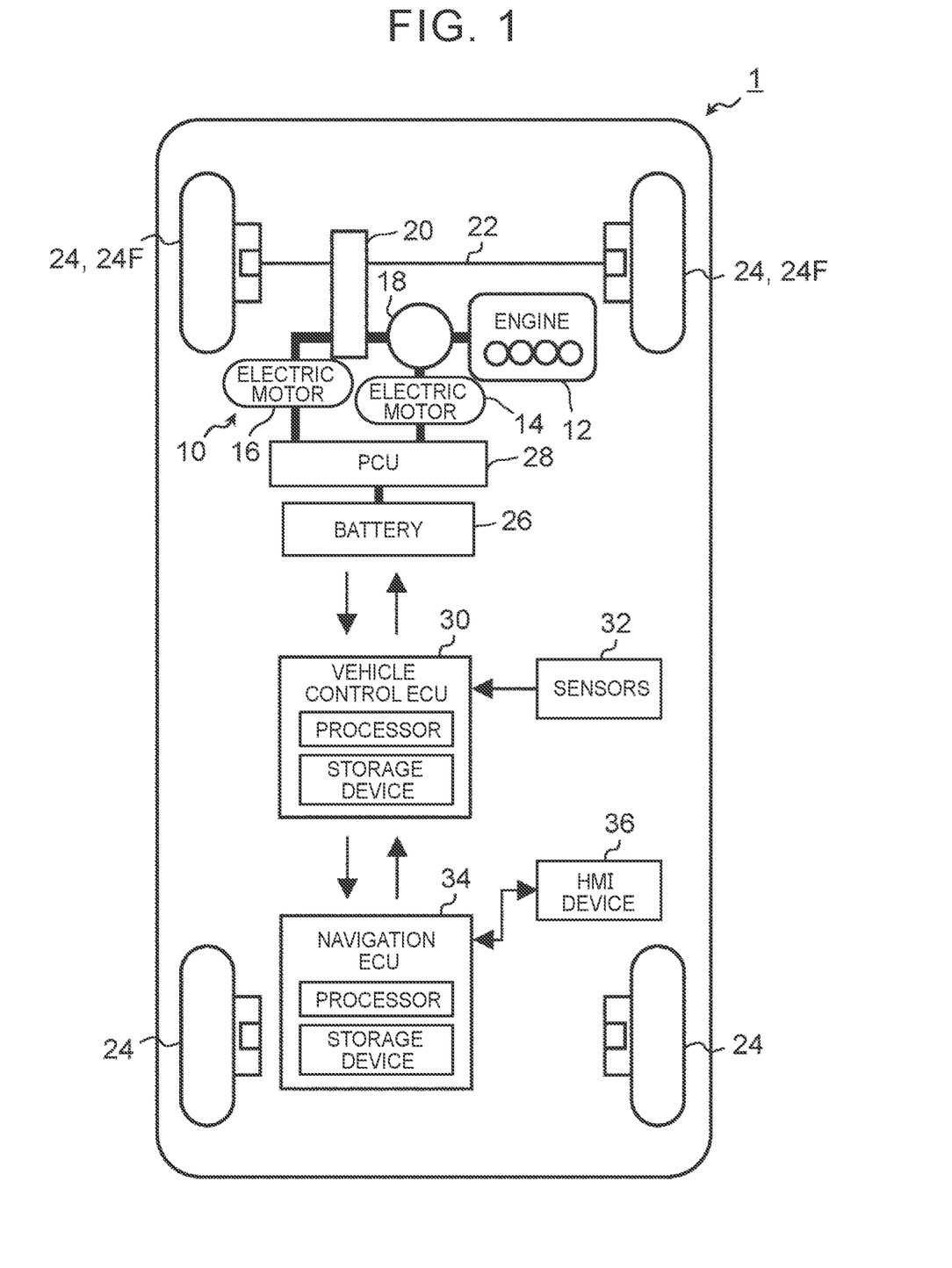
FIG. 1 is a diagram schematically showing an example of a configuration of a hybrid electric vehicle according to an embodiment.
Figure 2:
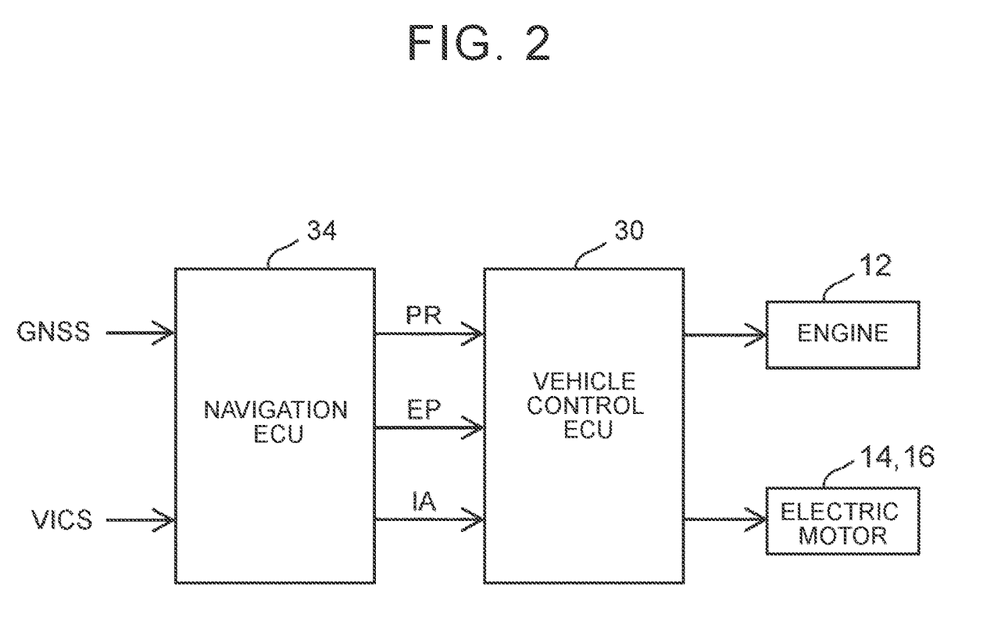
FIG. 2 is a block diagram showing a functional configuration of a control system of the hybrid electric vehicle shown in FIG. 1.

FIG. 1 is a diagram schematically showing an example of a configuration of a hybrid electric vehicle 1 according to an embodiment. FIG. 2 is a block diagram showing a functional configuration of a control system of the hybrid electric vehicle 1 shown in FIG. 1. The hybrid electric vehicle (hereinafter, also simply referred to as "vehicle") 1 includes a powertrain 10 that constitutes, for example, a power split type hybrid system.

The powertrain 10 includes an internal combustion engine 12 and two electric motors 14 and 16 as power sources, along with a power split mechanism 18, a speed reducer 20, and a drive shaft 22. As will be described below, the powertrain 10 is configured to be able to perform hybrid traveling (HEV traveling) and power generation through cooperation between the internal combustion engine 12 and the electric motors 14 and 16. In addition, the powertrain 10 is configured to be able to perform electric traveling (battery electric vehicle (BEV) traveling) using the electric motor 16 without operating the internal combustion engine 12.

The electric motors 14 and 16 each also function as generators. More specifically, the electric motor 14 primarily functions as a generator, and the electric motor 16 primarily functions as an electric motor. The electric motors 14 and 16 are, for example, alternating current (AC) synchronous motors. The electric motor 14 and the internal combustion engine 12 are connected to each other by the power split mechanism 18. The power split mechanism 18 and the electric motor 16 are connected to each other via the speed reducer 20. The speed reducer 20 includes a differential gear and is connected to wheels 24 (front wheels 24F in the example shown in FIG. 1) via the drive shaft 22. The power split mechanism 18 splits the power from the internal combustion engine 12 to distribute the power to the electric motor (generator) 14 and the speed reducer 20. The speed reducer 20 reduces the speed of the power from the internal combustion engine 12 and the power from the electric motor 16 that are transmitted via the power split mechanism 18, and transmits the power to the wheels 24 via the drive shaft 22.

The vehicle 1 also includes a battery 26 and a power control unit (PCU) 28. The battery 26 transmits and receives electric power to and from the powertrain 10 (more specifically, each of the electric motors 14 and 16) via the PCU 28. The PCU 28 includes an inverter, converts electric power stored in the battery 26 from direct current to alternating current, and supplies the electric power to the electric motor 16. As a result, the electric motor 16 is driven. The electric motor 14 can generate electric power by being driven by the power from the internal combustion engine 12. The electric motor 16 can generate electric power by being driven by the rotation of the wheels 24. The electric power generated by the electric motor 14 or the electric motor 16 is converted from alternating current to direct current by the PCU 28, and then stored in the battery 26. Thus, the battery 26 is charged by the electric power generated by the electric motors 14 and 16 and discharged by the electric power consumed by the electric motor 16.

Furthermore, the vehicle 1 includes an electronic control unit (ECU) 30 corresponding to a "control device" for controlling the vehicle 1. In the following description, the ECU 30 is also referred to as a vehicle control ECU 30. The ECU 30 has a processor and a storage device. The ECU 30 receives sensor signals from sensors 32 mounted on the vehicle 1 and outputs operation signals to the powertrain 10 (the internal combustion engine 12 and the electric motors 14 and 16) and the PCU 28. Various control programs for controlling the powertrain 10 and the PCU 28 are stored in the storage device. The processor reads the control program stored in the storage device and executes the control program, thereby realizing various controls related to the powertrain 10 and the PCU 28. Note that the functions of the ECU 30 described below may be realized by a plurality of ECUs.

The sensors 32 include various sensors used for controlling the powertrain 10, such as a vehicle speed sensor, an accelerator position sensor, a brake position sensor, and an SOC sensor. The SOC sensor detects the remaining level (in other words, state of charge (SOC)) of the battery 26. In the following description, the remaining level of the battery 26 is referred to as "remaining battery level SOC".

The ECU 30 can selectively execute a plurality of traveling modes including "BEV mode", "HEV mode", and "charging mode" as the traveling mode of the vehicle 1.

The BEV mode is a mode in which BEV traveling is performed using the electric motor 16 without operating the internal combustion engine 12.

The HEV mode is a mode in which HEV traveling (vehicle traveling through cooperation of the internal combustion engine 12 and the electric motors 14 and 16) is performed while maintaining the remaining battery level SOC. More specifically, in the example of the vehicle 1 shown in FIG. 1, the HEV mode is executed by driving the wheels 24 using the driving force of the internal combustion engine 12 and the electric motor 16, while using the electric power generated by the electric motor 14 using the power from the internal combustion engine 12 to charge the battery 26 and to supply the electric power to the electric motor 16. The remaining battery level SOC is maintained as the ECU 30 controls the operation of the internal combustion engine 12, the operation of the electric motors 14 and 16, and the charging of the battery 26 so that the (actual) remaining battery level SOC approaches, for example, a target remaining battery level (target SOC) equal to the current remaining battery level SOC.

The charging mode is a mode in which the HEV traveling is performed while increasing the remaining battery level SOC (in other words, a second HEV mode). More specifically, in the example of the vehicle 1, the remaining battery level SOC is increased in the charging mode as the ECU 30 controls the operation of the internal combustion engine 12, the operation of the electric motors 14 and 16, and the charging of the battery 26 so that a target SOC that is set higher than the current remaining battery level SOC is satisfied during the HEV traveling.

As long as the above-described BEV mode, HEV mode, and charging mode can be executed, the hybrid system of the "hybrid electric vehicle" according to the present disclosure can be a series system, a parallel system, or the like instead of the above-described power split type system. The "hybrid electric vehicle" according to the present disclosure may also be configured as an externally chargeable plug-in hybrid electric vehicle (PHEV). Furthermore, the "hybrid electric vehicle" is not limited to being operated by a user, but may be remotely operated by an external device, or may have at least a part of the driving operation automated by an autonomous driving system.

As shown in FIGS. 1 and 2, the vehicle 1 includes a navigation ECU (hereinafter also referred to as "navigation ECU") 34. The navigation ECU 34 has a processor and a storage device. The navigation ECU 34 is configured to be able to communicate with an external system via a wireless communication network, and can acquire various data from the external system.

For example, the navigation ECU 34 acquires the current position of the vehicle 1 using a Global Navigation Satellite System (GNSS). The navigation ECU 34 can specify the current position of the vehicle 1 on a map by acquiring map information from an external server, for example. The map information here includes information on a "specific area IA" in which the vehicle 1 is restricted from traveling with the operation of the internal combustion engine 12, and geographical information (for example, speed limit, distance, and road type). Although not particularly limited, such a specific area IA (e.g., low emission zone) is set in a specific urban area or is temporarily set according to, for example, the time of day or traffic conditions for the purpose of reducing the environmental load. The navigation ECU 34 can also acquire various types of traffic information such as congestion information, traffic regulation information, and traffic accident information from a traffic information center such as a Vehicle Information and Communication System (registered trademark: VICS) center. The navigation ECU 34 can notify the user of the vehicle 1 of such various information using a human machine interface (HMI) device 36. The HMI device 36 includes, for example, a display unit and an input unit provided inside the vehicle 1. The display unit is, for example, a display of a navigation system or a meter installed on an instrument panel. The input unit is a touch panel or switches.

The navigation ECU 34 can also accept user operations via the HMI device 36. For example, when the user operates the HMI device 36 to input a destination, the navigation ECU 34 creates a predicted travel route PR from the current position of the vehicle 1 to the destination and displays it on the HMI device 36. It should be noted that the navigation ECU 34 does not necessarily need to create the predicted travel route PR based on the destination input by the user. As an example, the navigation ECU 34 may create a predicted travel route PR on which the vehicle 1 is estimated to travel based on past travel data. Also, the specific area IA may be set by the user who operates the HMI device 36, for example.

The navigation ECU 34 can calculate an estimated value EP of the required traveling power required for traveling each travel section of the predicted travel route PR based on at least one of the past travel data and information such as the type of road surface and the gradient included in the map information. Further, the navigation ECU 34 can also calculate an estimated value EPt of the required energy required to travel through the predicted travel route PR by integrating the estimated value EP of the required traveling power on the predicted travel route PR. In addition, the navigation ECU 34 can also calculate an estimated value Ezev of the required energy required to travel through a specific section IS described later by the BEV traveling.

As shown in FIG. 2, the navigation ECU 34 is connected to the vehicle control ECU 30 so as to be communicable with each other by Controller Area Network (CAN) communication, for example. Thus, the vehicle control ECU 30 can acquire from the navigation ECU 34 various types of information including the above-described predicted travel route PR and various types of information (look-ahead information) related to the predicted travel route PR. The look-ahead information is information related to each travel section along the predicted travel route PR. Specifically, the look-ahead information includes, for example, the above-described map information (information on the specific area IA and geographical information (e.g., speed limit, distance, and road type)), traffic information (e.g., congestion information, regulation information, and traffic accident information), the vehicle speed, and the estimated value EP of the required traveling power.

At least a part of the various information (including the predicted travel route PR and the look-ahead information) transmitted to the vehicle control ECU 30 may be created and acquired by at least a cloud server and the user's mobile phone in place of or together with the navigation ECU 34 mounted on the vehicle 1.

2. Automatic Selection Control of Traveling Mode

The vehicle control ECU 30 executes the following "basic control A" and "specific section BEV control" as automatic selection control for automatically selecting the traveling mode of the vehicle 1 using the look-ahead information. As the automatic selection control, only the specific section BEV control may be executed without executing the basic control A.

2-1. Basic Control A

The basic control A is executed using the above-described look-ahead information acquired from the navigation ECU 34 in order to assist the user in driving the vehicle 1 with high fuel efficiency. In the basic control A, the ECU 30 prereads the entire travel load on the predicted travel route PR based on the look-ahead information, and divides the predicted travel route PR into a plurality of travel sections. The ECU 30 then selects the traveling mode to be used in each of the divided travel sections so that the traveling mode is optimal for realizing high fuel consumption traveling.

Selection of the traveling mode in the basic control A can be performed as follows as an example. That is, the ECU 30 selects the BEV mode for low-load sections in which the engine efficiency is relatively low when viewed from the entire predicted travel route PR, and selects the HEV mode for travel sections other than the low-load sections. As the look-ahead information for selecting such a traveling mode, for example, information such as the estimated value EP of the required traveling power for each travel section, the length of the travel section, and the vehicle speed is used. More specifically, for example, the ECU 30 selects the BEV mode when the estimated value EP is less than a threshold, and selects the HEV mode when the estimated value EP is equal to or greater than the threshold.

2-2. Specific Section BEV Control (SOC Management)

The predicted travel route PR may be created so that the vehicle 1 passes through the above-described specific area IA (area where the operation of the internal combustion engine 12 is restricted). In the following description, a travel section on the predicted travel route PR included in the specific area IA will be referred to as the "specific section IS".

The specific section BEV control is executed, for example, when the specific section IS exists on the predicted travel route PR of the vehicle 1 while the basic control A is being executed. The specific section BEV control is one of the traveling assistance functions of the vehicle 1 for performing appropriate management of the remaining battery level SOC (SOC management) required to travel through the specific section IS by the BEV traveling.

Specifically, the estimated value Ezev of the required energy required to travel through the specific section IS by the BEV traveling is calculated by the navigation ECU 34 as described above. The outline of the specific section BEV control (SOC management) is to control (maintain/increase) the remaining battery level SOC so that the required remaining battery level SOCr corresponding to the estimated value Ezev is secured before the vehicle 1 reaches the specific section IS.

Here, an error may be included in the prediction (estimation) of the required remaining battery level SOCr (estimated value Ezev) based on the look-ahead information. In addition, the traveling of the vehicle 1 by the user may include variations. It is desirable that the SOC management by the specific section BEV control be performed so that it is possible to secure, together with the required remaining battery level SOCr, a margin α of the remaining battery level SOC in consideration of error factors such as prediction errors of the required remaining battery level SOCr and traveling variations described above.

Therefore, in view of the issue of securing an appropriate remaining battery level SOC in consideration of error factors as described above and the issue of suppressing excessive charging, which will be described in detail later with reference to FIG. 4, the specific section BEV control according to the present embodiment is executed as follows.

That is, when the specific section IS exists on the predicted travel route PR, the ECU 30 executes the SOC management for securing a specific remaining battery level SOCx, which is the required remaining battery level SOCr plus the margin α, as the traveling assistance. The ECU 30 then selects the traveling mode before entering the specific section IS from among the BEV mode, the HEV mode, and the charging mode based on the presence or absence of the execution history of the traveling assistance (SOC management) and the remaining battery level SOC. Hereinafter, for convenience of explanation, the process of selecting the traveling mode in this way will be referred to as "selection process".

Specifically, in the selection process, the ECU 30 selects the BEV mode or the charging mode when there is no execution history. On the other hand, when there is an execution history, the ECU 30 selects any one of the BEV mode, the HEV mode, and the charging mode.

More specifically, in the selection process, the ECU 30 selects the BEV mode regardless of the presence or absence of the execution history when the remaining battery level SOC is equal to or greater than the specific remaining battery level SOCx (=SOCr+α).

Further, in the selection process, when there is no execution history and the remaining battery level SOC is less than the specific remaining battery level SOCx, the ECU 30 selects the charging mode so that the remaining battery level SOC increases to the specific remaining battery level SOCx. On the other hand, in the case where there is an execution history, when the remaining battery level SOC is less than the specific remaining battery level SOCx and equal to or greater than the required remaining battery level SOCr, the HEV mode is selected, and when the remaining battery level SOC is less than the required remaining battery level SOCr, the charging mode is selected so that the remaining battery level SOC increases to the specific remaining battery level SOCx.

Figure 3A:
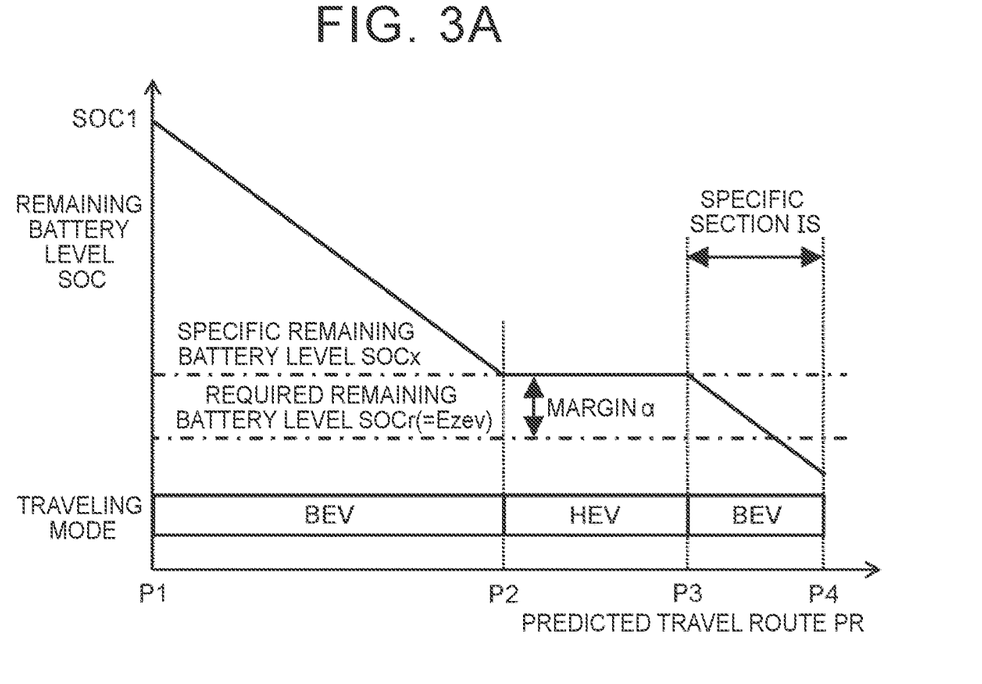
FIG. 3A is a diagram showing an example of operation based on specific section BEV control (SOC management) according to the embodiment.
Figure 3B:
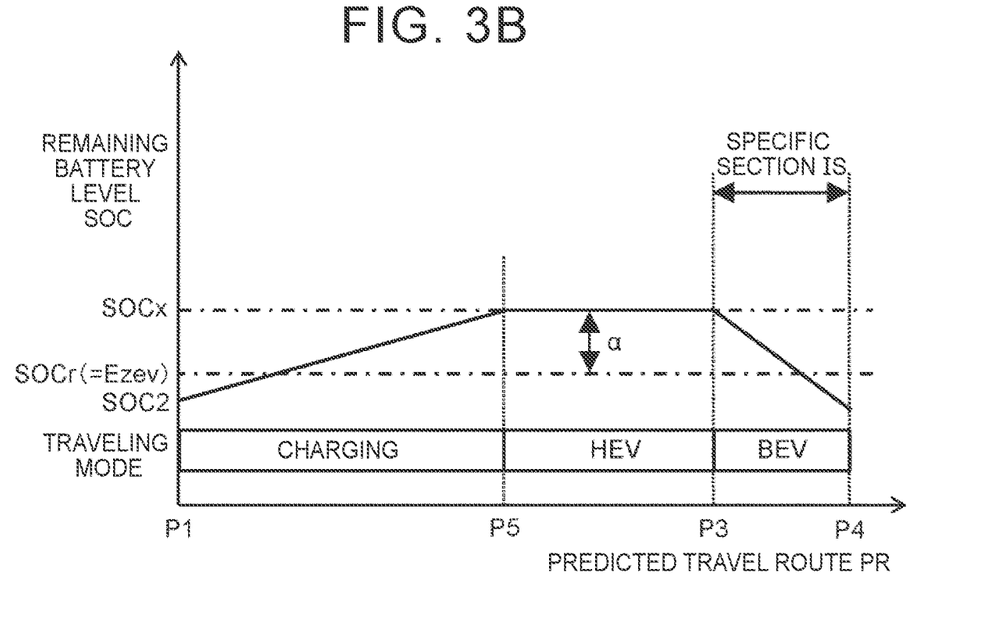
FIG. 3B is a diagram showing an example of the operation based on the specific section BEV control (SOC management) according to the embodiment.

FIGS. 3A and 3B are diagrams showing examples of the operation based on the specific section BEV control (SOC management) according to the embodiment. FIGS. 3A and 3B show the specific section IS. Point P1 corresponds to a point at which the SOC management by the specific section BEV control is started. Point P1 may be either a starting point or a passing point on the predicted travel route PR. The end point P4 of the specific section IS may be either the destination or a passing point on the predicted travel route PR.

In the example shown in FIG. 3A, at point P1, the battery 26 has a remaining battery level SOC1 that is greater than the "specific remaining battery level SOCx (=SOCr+α)" obtained by adding the margin α to the required remaining battery level SOCr. In this case, the ECU 30 selects the BEV mode from point P1 in accordance with the specific section BEV control.

Point P2 corresponds to the point at which the remaining battery level SOC has decreased to the specific remaining battery level SOCx due to the BEV traveling based on the BEV mode from point P1. The ECU 30 switches the traveling mode from the BEV mode to the HEV mode at this point P2. Thus, as shown in FIG. 3A, the vehicle 1 performs the HEV traveling so as to maintain the value of the remaining battery level SOC (that is, the specific remaining battery level SOCx) at point P2.

As in the example shown in FIG. 3A described above, when the SOC management is started in a state in which the remaining battery level SOC (for example, SOC1) is equal to or greater than the specific remaining battery level SOCx including the margin α, the BEV mode is selected, and subsequently the HEV mode is selected so that the specific section IS can be entered at point P3 with the specific remaining battery level SOCx remaining.

Next, in the example shown in FIG. 3B, at point P1, the battery 26 only has a remaining battery level SOC2 that is less than the required remaining battery level SOCr. In this case, the ECU 30 selects the charging mode from point P1 in accordance with the specific section BEV control. As a result, the HEV traveling is performed while increasing the remaining battery level SOC.

Point P5 corresponds to a point at which the remaining battery level SOC has decreased to the specific remaining battery level SOCx due to the HEV traveling according to the charging mode from point P1. The ECU 30 switches the traveling mode from the charging mode to the HEV mode at this point P5. Thus, as shown in FIG. 3B, the vehicle 1 performs the HEV traveling so as to maintain the value of the remaining battery level SOC (that is, the specific remaining battery level SOCx) at point P5.

As in the example shown in FIG. 3B described above, when the SOC management is started in a state in which the remaining battery level SOC (for example, SOC2) is less than the required remaining battery level SOCr, the charging mode is selected and the remaining battery level SOC is increased so that the specific remaining battery level SOCx can be obtained. After the specific remaining battery level SOCx is secured, the HEV mode is selected so that the specific section IS can be entered with the specific remaining battery level SOCx remaining.

Figure 4:
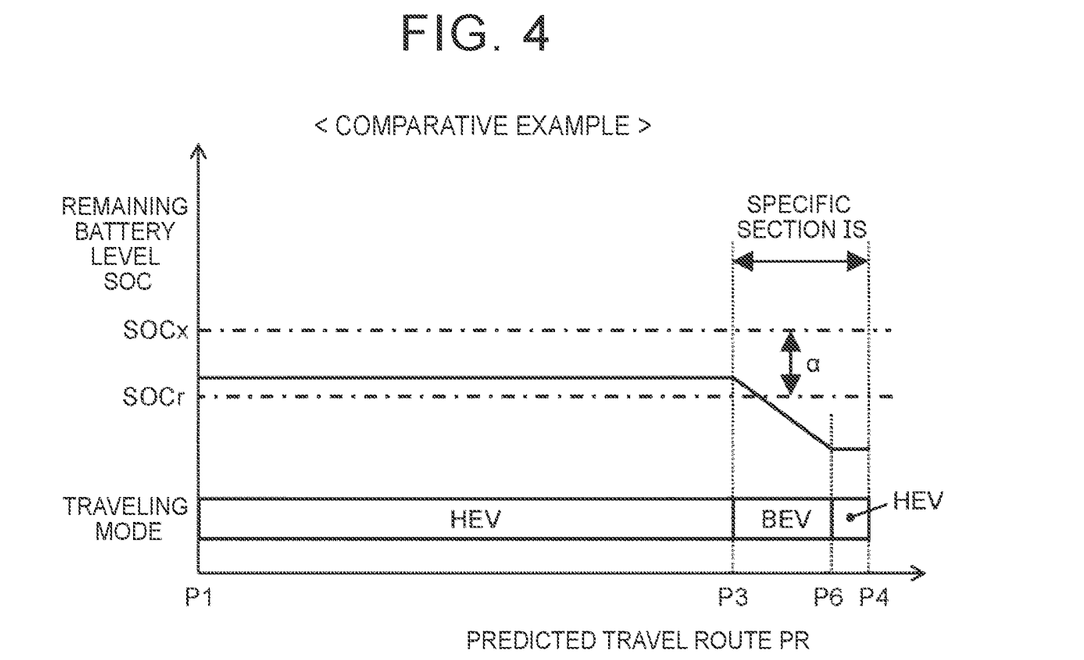
FIG. 4 is a diagram illustrating a comparative example in which an issue related to the specific section BEV control according to the embodiment occurs.

Next, FIG. 4 is a diagram illustrating a comparative example in which an issue related to the specific section BEV control according to the embodiment occurs. Unlike FIGS. 3A and 3B described above, FIG. 4 shows an SOC condition in which the remaining battery level SOC satisfies the required remaining battery level SOCr but does not satisfy the specific remaining battery level SOCx including the margin α (SOCr≤SOC<SOCx) at point 1.

The charging mode using the HEV traveling uses the electric power generated through cooperation between the internal combustion engine 12 and the electric motor (generator) 14. Thus, if excessive charging is performed using the internal combustion engine 12 in order to secure the remaining battery level SOC, fuel consumption will deteriorate. Therefore, in the above SOC condition, it is conceivable to select the HEV mode from point P1 as in the comparative example shown in FIG. 4 because the required remaining battery level SOCr is satisfied. However, if the HEV mode is continuously selected under such an SOC condition, a sufficient margin for the required remaining battery level SOCr may not be able to be secured at point P3 at which the specific section IS is reached, as in the comparative example shown in FIG. 4. As a result, there is a possibility that the specific section IS cannot be traveled through by the BEV traveling due to the error factors described above. More specifically, in the comparative example shown in FIG. 4, at point P6 partway through the specific section IS, the remaining battery level SOC drops to the lower limit value of the range of the remaining battery level SOC in which the BEV traveling can be executed, and thus the traveling mode is switched from the BEV mode to the HEV mode.

Figure 5:
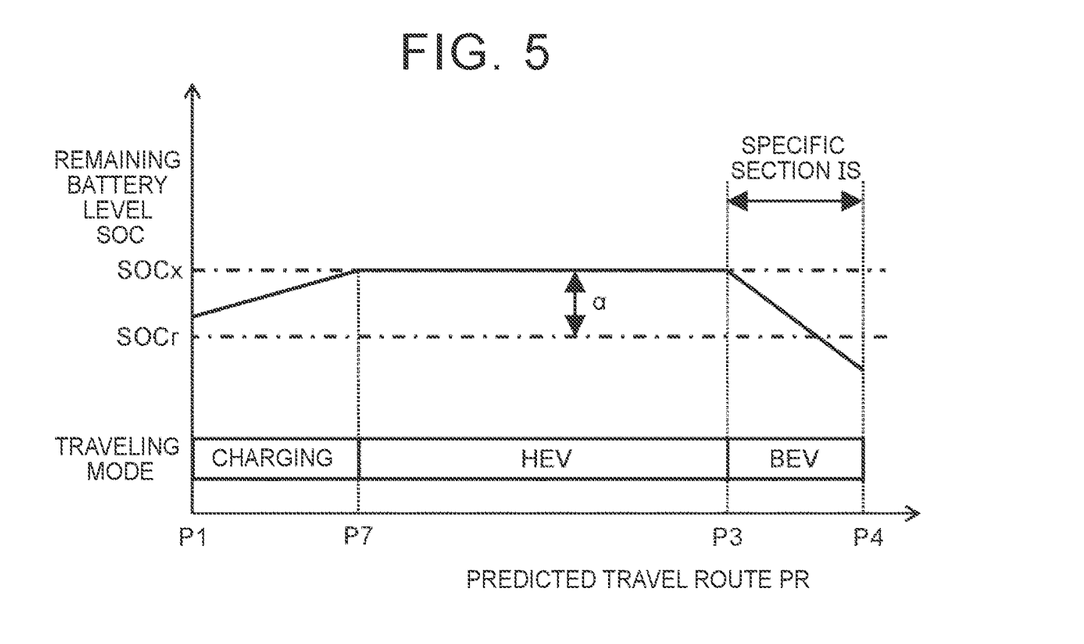
FIG. 5 is a diagram illustrating the operation of the specific section BEV control according to the embodiment under the same SOC condition as in FIG. 4.

FIG. 5 is a diagram illustrating the operation of the specific section BEV control (SOC management) according to the embodiment under the same SOC condition as in FIG. 4 (SOCr≤SOC<SOCx). In the present embodiment, when starting the specific section BEV control (traveling assistance) at point P1 under the SOC condition shown in FIG. 5, the ECU 30 selects the charging mode to secure the specific remaining battery level SOCx.

Point P7 in FIG. 5 corresponds to a point at which the remaining battery level SOC reaches the specific remaining battery level SOCx after the charging mode is selected. As an example, the ECU 30 turns ON an execution history flag indicating whether there is an execution history (record) of the traveling assistance by the specific section BEV control (that is, the SOC management) at this point P7. Note that even if the power switch (ignition switch) of the vehicle 1 is turned OFF by the user in the travel section from point P7 to point P3, the execution history flag is kept ON when the traveling assistance is not stopped.

The same applies in the case where, as in the example shown in FIG. 3A described above, the specific section BEV control (traveling assistance) is started from a state in which the remaining battery level SOC (for example, SOC1) is greater than the specific remaining battery level SOCx at point P1. That is, in the example shown in FIG. 3A, the execution history flag is turned ON at point P2 at which the remaining battery level SOC drops from a value greater than the specific remaining battery level SOCx to the specific remaining battery level SOCx.

Further, after switching to the HEV mode in a state in which the remaining battery level SOC becomes the specific remaining battery level SOCx (that is, a state in which the margin α is secured) after the traveling assistance is started as in the examples shown in FIGS. 5 and 3A, the remaining battery level SOC may fall below the specific remaining battery level SOCx due to fluctuations in the remaining battery level SOC during the control of the remaining battery level SOC by the HEV mode. In the present embodiment, even if the remaining battery level SOC falls below the specific remaining battery level SOCx and the SOC condition (SOCr≤SOC<SOCx) is satisfied during the execution of the HEV mode as described above, the switching to the charging mode to secure the specific remaining battery level SOCx again is not performed.

The reason for this is that the HEV mode is executed so as to maintain the remaining battery level SOC as described above. More specifically, when there is an execution history of the traveling assistance, in accordance with the HEV mode, the HEV traveling is performed so as to maintain the value of the remaining battery level SOC when the switching to the HEV mode was performed (that is, the specific remaining battery level SOCx). It can therefore be considered that even if the remaining battery level SOC falls below the specific remaining battery level SOCx during the execution of the HEV mode, the remaining battery level SOC does not greatly deviate from the specific remaining battery level SOCx. It can also be considered that the margin α also functions as a margin for fluctuations in the remaining battery level SOC that may occur when attempting to maintain the remaining battery level SOC at the specific remaining battery level SOCx by the HEV mode.

Therefore, as described above, when there is an execution history of the traveling assistance, even if the above SOC condition is satisfied after the HEV mode is selected, switching to the charging mode is not performed, thereby avoiding excessive charging and thus suppressing deterioration of fuel consumption, and making it possible to travel through the specific section IS by the BEV traveling.

2-2-1. Processes Performed by ECU

Figure 6:
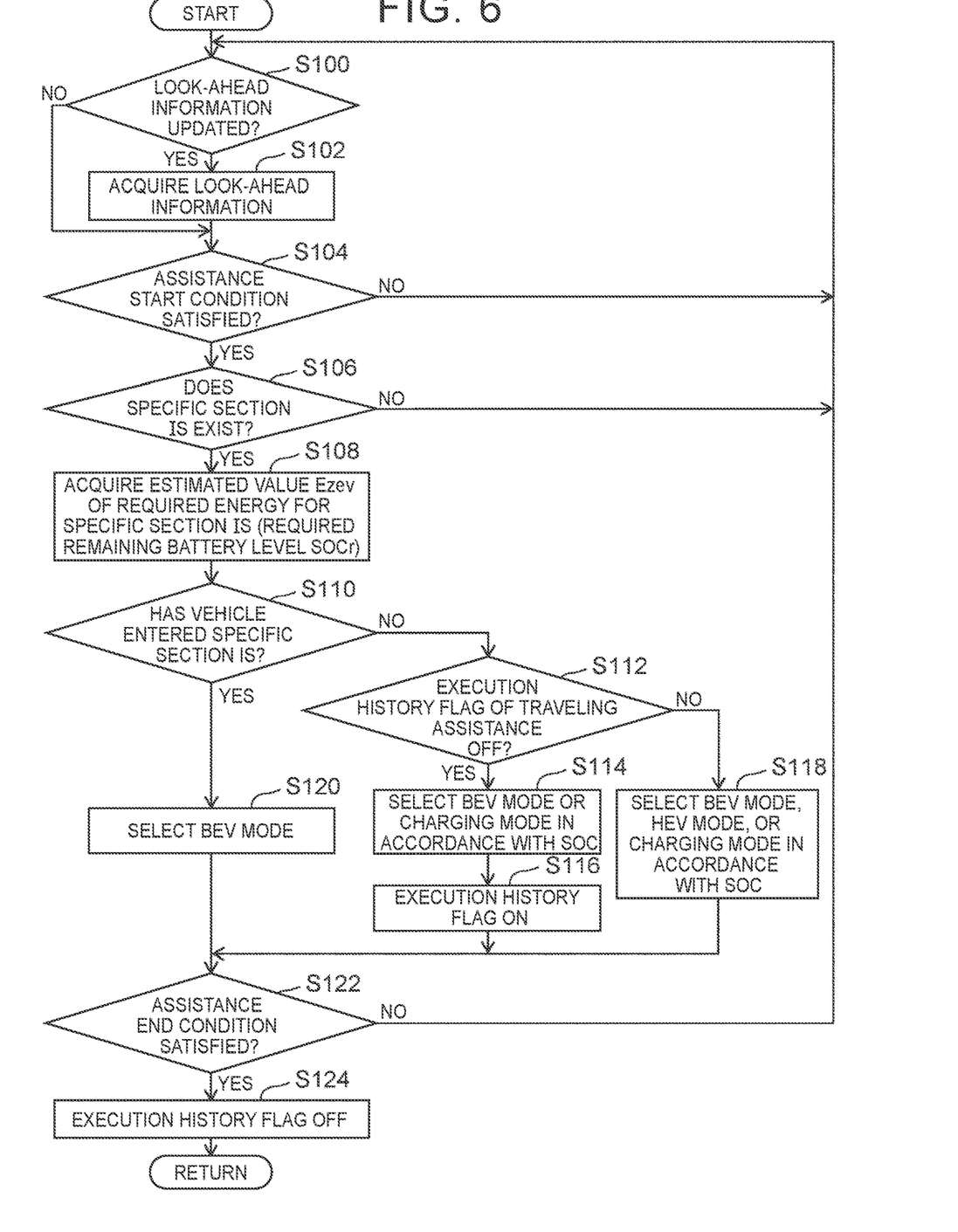
FIG. 6 is a flowchart showing an example of processes related to the specific section BEV control according to the embodiment.

FIG. 6 is a flowchart showing an example of processes related to the specific section BEV control according to the embodiment. The processes of this flowchart are repeatedly executed, for example, during the execution of the automatic selection control of the traveling mode using the look-ahead information.

In step S100, the ECU 30 determines whether the look-ahead information for the automatic selection control has been updated based on the presence or absence of notification from the navigation ECU 34. As already explained, the look-ahead information includes information on each travel section along the predicted travel route PR (for example, information on the specific area IA, the vehicle speed, the estimated value EP of the required traveling power, the distance, the road type, and the traffic congestion information). Note that the look-ahead information is updated, for example, when the predicted travel route PR is changed due to the change of the destination by the user's operation of the HMI device 36. When the look-ahead information is updated, the estimated value EP of the required traveling power may also change.

When the look-ahead information has been updated, the process proceeds to step S102. In step S102, the ECU 30 acquires the latest look-ahead information from the navigation ECU 34. After that, the process proceeds to step S104. When the look-ahead information has not been updated, the process proceeds to step S104.

In step S104, the ECU 30 determines whether an assistance start condition is satisfied. The assistance start condition here is a condition that is satisfied when the traveling assistance (SOC management) by the specific section BEV control can be started, and includes, for example, that the vehicle 1 is on the road and that no abnormality has occurred in the vehicle 1. When the assistance start condition is not satisfied, the process returns to step S100, and when the assistance start condition is satisfied, the process proceeds to step S106. It should be noted that the automatic selection control is switched from the basic control A described above to the specific section BEV control when the assistance start condition is satisfied.

In step S106, the ECU 30 determines whether there is a specific section IS ahead of the predicted travel route PR based on the presence or absence of notification from the navigation ECU 34. As a result, when there is no specific section IS, the process returns to step S100, and when there is a specific section IS, the process proceeds to step S108.

In step S108, the ECU 30 acquires from the navigation ECU 34 the estimated value Ezev of the required energy required to travel through, by the BEV traveling, the specific section IS that has been determined to exist in step S106 (that is, the required remaining battery level SOCr). The estimated value Ezev (required remaining battery level SOCr) may be calculated by the vehicle control ECU 30.

Next, in step S110, the ECU 30 determines whether the vehicle 1 has entered the specific section IS based on the positional information of the vehicle 1 on the map specified by the navigation ECU 34. As a result, when the determination result is No (that is, when the vehicle 1 is traveling in the travel section before entering the specific section IS), the process proceeds to step S112.

In step S112, the ECU 30 determines whether an execution history flag related to the traveling assistance by the specific section BEV control (SOC management) is OFF. As a result, when the execution history flag is OFF (that is, when there is no execution history (record) of the traveling assistance), the process proceeds to step S114.

The process of step S114 is executed to select (determine) the traveling mode when the process first proceeds from step S106 to step S114 via steps S108 to S112. The process of step S114 corresponds to the "selection process" described above.

In step S114, the ECU 30 compares the current remaining battery level SOC with the specific remaining battery level SOCx (=required remaining battery level SOCr+margin α). The magnitude of the margin α is determined in advance in consideration of error factors such as the above-described prediction errors and traveling variations, for example. More specifically, the margin α is determined to have a magnitude such that when the HEV mode is executed so as to maintain the specific remaining battery level SOCx, the remaining battery level SOC controlled by the HEV mode does not fall below the required remaining battery level SOCr.

In step S114, when the current remaining battery level SOC is equal to or greater than the specific remaining battery level SOCx (SOC≥SOCx), the ECU 30 selects (executes) the BEV mode. On the other hand, when the current remaining battery level SOC is less than the specific remaining battery level SOCx (SOC<SOCx), the ECU 30 selects (executes) the charging mode so that the remaining battery level SOC increases to the specific remaining battery level SOCx.

By executing the process of step S114 described above, it can be considered that the traveling assistance has been performed so that the specific remaining battery level SOCx that satisfies the margin α is secured, including the case where the remaining battery level SOC at the start of the traveling assistance (SOC management) is less than the specific remaining battery level SOCx. Therefore, in subsequent step S116, the ECU 30 turns ON the execution history flag.

On the other hand, when the execution history flag is ON in step S112 (that is, when there is an execution history (record) of the traveling assistance), the process proceeds to step S118. The process of step S118 also corresponds to the "selection process" described above.

In step S118, the ECU 30 compares the current remaining battery level SOC with the specific remaining battery level SOCx or the required remaining battery level SOCr. Specifically, when the current remaining battery level SOC is equal to or greater than the specific remaining battery level SOCx (SOC≥SOCx), the ECU 30 selects (executes) the BEV mode in the same manner as in step S114. When the current remaining battery level SOC is less than the specific remaining battery level SOCx and equal to or greater than the required remaining battery level SOCr (SOXr≤SOC<SOCx), the ECU 30 selects (executes) the HEV mode. Further, when the current remaining battery level SOC is less than the required remaining battery level SOCr (SOC<SOCr), the ECU 30 selects (executes) the charging mode so that the remaining battery level SOC increases to the specific remaining battery level SOCx.

On the other hand, when the determination result in step S110 is Yes (that is, when the vehicle 1 has entered the specific section IS), the ECU 30 selects (executes) the BEV mode in step S120.

In step S122 following the process of step S116, step S118, or step S120, the ECU 30 determines whether the assistance end condition is satisfied. The assistance end condition here is a condition that is satisfied when the traveling assistance (SOC management) by the specific section BEV control is terminated. The assistance end condition is satisfied, for example, when the vehicle 1 leaves the specific area IA, when the user operates the HMI device 36 to stop the traveling assistance, or when the route guidance itself by the navigation system is stopped.

While the assistance end condition is not satisfied in step S122, the processes of step S100 and after are repeatedly executed. On the other hand, when the assistance end condition is satisfied, the specific section BEV control is terminated, and in step S124, the ECU 30 turns OFF the execution history flag. That is, the history of the current traveling assistance is cleared. Note that the execution history flag may be turned OFF not only when the assistance end condition is satisfied, but also when the destination or the predicted travel route PR is updated during the execution of the traveling assistance, for example.

3. Effect

As described above, according to the present embodiment, with the execution of the specific section BEV control, the SOC management for securing the specific remaining battery level SOCx obtained by adding the margin α to the required remaining battery level SOCr to travel through the specific section IS by the BEV traveling is executed as the traveling assistance. As a result, the remaining battery level SOC can be appropriately managed in consideration of error factors such as the above-described prediction errors and traveling variations.

According to the present embodiment, the traveling mode before entering the specific section IS is selected from the BEV mode, the HEV mode, and the charging mode based on the presence or absence of the execution history of the traveling assistance and the remaining battery level SOC. Specifically, according to the processes of steps S112 to S118 shown in FIG. 6, in the case where the BEV mode is selected for the first time after the start of the traveling assistance in step S114, the HEV mode will be selected when the remaining battery level SOC drops to the specific remaining battery level SOCx thereafter (see FIG. 3A). That is, the transition to the HEV mode is performed with the margin α secured. Further, when the charging mode is selected in step S114, the HEV mode will be selected when the remaining battery level SOC increases to the specific remaining battery level SOCx thereafter (see FIG. 5). That is, also in this case, the transition to the HEV mode is performed with the margin α secured. With the HEV mode, it is possible to secure (maintain) a remaining battery level SOC equivalent to the specific remaining battery level SOCx for traveling through the specific section IS while refraining from excessive charging. As described above, according to the present embodiment, it is possible to appropriately manage the remaining battery level SOC for traveling through the specific section IS by the BEV traveling. More specifically, it is possible to perform management of the remaining battery level SOC that enables both securing an appropriate remaining battery level SOC for traveling through the specific section IS by the BEV traveling and suppressing excessive charging.

What is claimed is:
1. A hybrid electric vehicle comprising:
a powertrain configured to execute hybrid traveling and power generation, and electric traveling, the hybrid traveling and the power generation being performed through cooperation of an internal combustion engine and one or more electric motors, and the electric traveling being performed by the one or more electric motors without operating the internal combustion engine;
a battery that transmits and receives electric power to and from the powertrain; and
a control device, wherein
the control device
executes management of a current remaining battery level of the battery for securing a specific remaining battery level as traveling assistance, when a specific section in which operation of the internal combustion engine is restricted exists on a predicted travel route, the specific remaining battery level being obtained by adding a margin to a required remaining battery level required for traveling through the specific section by the electric traveling, and
executes a selection process for selecting, based on presence or absence of an execution history of the traveling assistance and the current remaining battery level, a traveling mode before entering the specific section from (i) a BEV mode, (ii) an HEV mode, and (iii) a charging mode, the BEV mode being a mode in which the electric traveling is performed, the HEV mode being a mode in which the hybrid traveling is performed while maintaining the current remaining battery level, and the charging mode being a mode in which the hybrid traveling is performed while increasing the current remaining battery level,
wherein in the selection process, the control device:
when execution history is absent and the current remaining battery level is less than the specific remaining battery level, selects the charging mode such that the current remaining battery level increases to the specific remaining battery level,
when the execution history is present and the current remaining battery level is less than the specific remaining battery level and equal to or greater than the required remaining battery level, selects the HEV mode, and when the execution history is present and the current remaining battery level is less than the required remaining battery level, selects the charging mode such that the current remaining battery level increases to the specific remaining battery level.

2. The hybrid electric vehicle according to claim 1, wherein in the selection process, the control device selects from among the BEV mode or the charging mode when there is no execution history, and selects from among the BEV mode, the HEEV mode, and the charging mode when there is the execution history.

3. The hybrid electric vehicle according to claim 1, wherein in the selection process, the control device selects the BEV mode when the current remaining battery level is equal to or greater than the specific remaining battery level.

4. A control method of a hybrid electric vehicle, the control method being a control method for controlling the hybrid electric vehicle including:
- a powertrain configured to execute hybrid traveling and power generation, and electric traveling, the hybrid traveling and the power generation being performed through cooperation of an internal combustion engine and one or more electric motors, and the electric traveling being performed by the one or more electric motors without operating the internal combustion engine; and
- a battery that transmits and receives electric power to and from the powertrain, the control method comprising:
- executing management of a remaining battery level of the battery for securing a specific remaining battery level as traveling assistance, when a specific section in which operation of the internal combustion engine is restricted exists on a predicted travel route, the specific remaining battery level being obtained by adding a margin to a required remaining battery level required for traveling through the specific section by the electric traveling; and
- selecting, based on presence or absence of an execution history of the traveling assistance and the remaining battery level, a traveling mode before entering the specific section from (i) a BEV mode, (ii) an HEV mode, and (iii) a charging mode, the BEV mode being a mode in which the electric traveling is performed, the HEV mode being a mode in which the hybrid traveling is performed while maintaining the remaining battery level, and the charging mode being a mode in which the hybrid traveling is performed while increasing the remaining battery level, wherein
when execution history is absent and the current remaining battery level is less than the specific remaining battery level, selects the charging mode such that the current remaining battery level increases to the specific remaining battery level,
when the execution history is present and the current remaining battery level is less than the specific remaining battery level and equal to or greater than the required remaining battery level, selects the HEV mode, and
when the execution history is present and the current remaining battery level is less than the required remaining battery level, selects the charging mode such that the current remaining battery level increases to the specific remaining battery level.

* * * * *